United States Patent Office 3,120,536
Patented Feb. 4, 1964

3,120,536
YOHIMBANE DERIVATIVES
John Shavel, Jr., Mendham, and Freeman H. McMillan, Dover, N.J., assignors to Warner-Lambert Pharmaceutical Company, Morris Plains, N.J., a corporation of Delaware
No Drawing. Filed Nov. 15, 1961, Ser. No. 152,614
2 Claims. (Cl. 260—288)

The present invention relates to new and novel non-toxic acid addition salts of compounds of the formula:

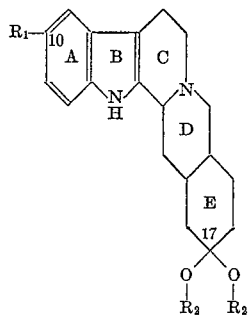

wherein $R_1$ is the acyl radical of an aliphatic carboxylic acid containing 1 to 6 carbon atoms and $R_2$ is a lower alkyl group.

The compounds of this invention bear the A, B, C, D and E rings as depicted in the above structural formula and are, generally alkaloids of the yohimbane series. Depending upon the configuration of the hydrogen atom at the 3 position and the existence of cis or trans fusion of the D and E rings, four different configurations are possible, that is yohimbane, 3- epiyohimbane, alloyohimbane and 3-epialloyohimbane. The present invention includes within its scope derivatives of these four families of alkaloids bearing an $R_1$ substituent at the 10 position and two $OR_2$ substituents at the 17 position.

Among the compounds of this invention are the non-toxic acid addition salts, for example, the monomaleate, sulfate, tartrate, phosphate, succinate, acetate, methylsulfonate, cinnamate, hydrochloride, hydrobromide, nitrate, sulfamate and the like, of such free bases as 10-acetyl-17,17-dimethoxyyohimbane, 10-propionyl-17,17-dimethoxyyohimbane, 10 - butyryl - 17,17-dimethoxyyohimbane, 10 - acetyl-17,17-diethoxyyohimbane, 10-acetyl-17,17-dibutoxyyohimbane and the like.

The compounds of this invention have interesting pharmacological activity and are useful as analgesics and tranquilizers. In addition, they are valuable intermediates in the preparation of other compounds of the yohimbane series.

It has now been found that the reaction of a compound of the formula:

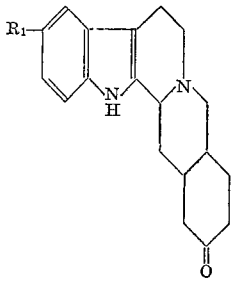

wherein $R_1$ is as described hereinabove with a lower aliphatic alcohol of the formula $R_2OH$ where $R_2$ is lower alkyl in the presence of an acid results in the formation of addition salts corresponding to the acid present in the reaction mixture of compounds of the formula:

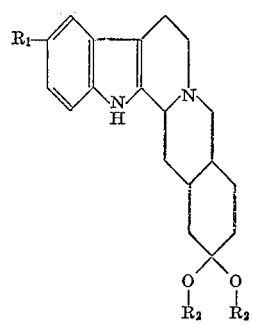

The lower aliphatic alcohol is present in a substantial excess and forms the solvent for the reaction. The mixture is heated to completion of the reaction, solvent removed by distillation and the product recovered by crystallization.

The starting materials which are 10-acylated derivatives of yohimbone may be prepared by the reaction of yohimbone with an acid anhydride or acyl halide having $R_1$ acyl groups at a temperature of $+25°$ C. to $-40°$ C. in the presence of a Friedel-Crafts catalyst as described in the co-pending application of John Shavel, Jr., entitled "Derivatives of 17-Ketoyohimbane Alkaloids and Process Therefor," Serial No. 88,306, filed February 10, 1961.

For therapeutic use, the compounds of this invention may be formulated with conventional pharmaceutical carriers into dosage unit forms such as tablets, capsules, elixirs, solutions, suspensions, suppositories and the like.

The following example is included in order further to illustrate the present invention:

Example 10-acetylyohimbone (63 g., 0.187 mol), M.P. 258–260° C. is suspended in methanol (200 ml.) and to this suspension is added a solution of maleic acid (24 g., 0.206 mol) in methanol (100 ml.). A homogeneous solution is obtained which is heated on a steam bath for 15 minutes. All solvent is removed by distillation in vacuo and the residue is crystallized from methanol (100 ml.). The crystalline produce is dried in an oven at 60° for one hour and then in a vacuum desiccator over phosphorous pentoxide overnight. Yield: 59 g., M.P. 194–196° C. of 10-acetyl-17,17-dimethoxyyohimbane monomaleate.

*Analysis.*—Calc.: C, 65.00; H, 6.82; N, 5.62. Found: C, 65.09; H, 6.92; N, 5.78.

In a similar manner, the sulfate, tartrate and hydrochloride salts of 10-acetyl-17,17-dimethoxyyohimbane are obtained, with sulfuric, tartaric and hydrochloric acids, respectively, replacing the maleic acid in the reaction mixture.

It is understood that the foregoing detailed description is given merely by way of illustration and that many variations may be made therein without departing from the spirit of our invention.

Having described our invention, what we desire to secure by Letters Patent is:

1. A member selected from the group consisting of a compound of the formula:

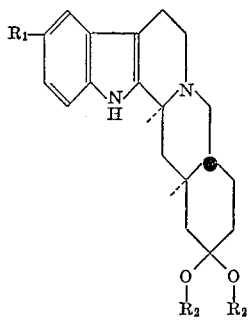

wherein $R_1$ is the acyl radical of an unsubstituted saturated aliphatic carboxylic acid of 1 to 6 carbon atoms and $R_2$ is lower alkyl, and the pharmaceutically acceptable nontoxic acid addition salts thereof selected from the group consisting of the monomaleate, sulfate, tartrate, phosphate, succinate, acetate, methyl sulfonate, cinnamate, hydrochloride, hydrobromide, nitrate and sulfonate.

2. A compound selected from the group consisting of 10-acetyl-17,17-dimethoxy-yohimbine and the pharmaceutically acceptable nontoxic addition salts thereof selected from the group consisting of the monomaleate, sulfate, tartrate, phosphate, succinate, acetate, methyl sulfonate, cinnamate, hydrochloride, hydrobromide, nitrate and sulfonate.

No references cited.